(12) United States Patent
Park (10) Patent No.: US 7,788,946 B2
(45) Date of Patent: Sep. 7, 2010

(54) REFRIGERATOR FOR GRAIN

(76) Inventor: Sung-Chul Park, 231-4 Sin-ri, Jinwi-myeon, Pyeongtaek, Kyeonggi-do, 451-865 (KR)

(*) Notice: Subject to any disclaimer, the term of this patent is extended or adjusted under 35 U.S.C. 154(b) by 1447 days.

(21) Appl. No.: 11/186,722

(22) Filed: Jul. 21, 2005

(65) Prior Publication Data

US 2005/0255209 A1    Nov. 17, 2005

Related U.S. Application Data

(63) Continuation of application No. PCT/KR2004/000087, filed on Jan. 19, 2004.

(30) Foreign Application Priority Data

| Jan. 22, 2003 | (KR) | ................... 2003-4177 |
| Jan. 22, 2003 | (KR) | ................... 2003-4182 |
| Mar. 27, 2003 | (KR) | ............... 2003-19092 |
| Dec. 30, 2003 | (KR) | ............. 2003-100422 |

(51) Int. Cl.
*F25B 39/02* (2006.01)

(52) U.S. Cl. ........................... 62/515; 426/524

(58) Field of Classification Search ............ 62/515, 62/632, 633
See application file for complete search history.

(56) References Cited

U.S. PATENT DOCUMENTS

| 2,799,947 | A | * | 7/1957 | Elwess ................. 34/408 |
| 3,475,832 | A | * | 11/1969 | Kuelling ............... 34/182 |
| 3,650,122 | A | * | 3/1972 | Lieberman ............. 62/298 |
| 4,043,051 | A | * | 8/1977 | Lussenden ............. 34/77 |
| 4,257,169 | A | * | 3/1981 | Pierce ................. 34/471 |
| 4,294,664 | A | * | 10/1981 | Anthony ............... 203/19 |
| 4,371,424 | A | * | 2/1983 | Anthony ............... 202/159 |
| 5,845,702 | A | * | 12/1998 | Dinh .................. 165/104.21 |
| 6,209,223 | B1 | * | 4/2001 | Dinh .................. 34/86 |

FOREIGN PATENT DOCUMENTS

| JP | 11-290227 | 10/1999 |
| JP | 2001-178641 | 7/2001 |
| KR | 2001-0046051 | 6/2001 |
| KR | 20-0279254 | 6/2002 |
| KR | 20-0283312 | 7/2002 |

* cited by examiner

*Primary Examiner*—Melvin Jones
(74) *Attorney, Agent, or Firm*—Park & Associates IP Law LLC (57) ABSTRACT

Disclosed is a grain refrigerator provided with a receiving container, a grain storage part installed in the receiving container, for storing a grain, and an evaporator forming a cooling cycle to keep the stored grain at a low temperature, wherein the evaporator is at least one or more and is installed in a grain storage space of the grain storage part to cool the stored grain.

13 Claims, 8 Drawing Sheets

REFRIGERATOR FOR GRAIN

This application is a continuation of pending International Patent Application No. PCT/KR2004/000087 filed Jan. 19, 2004 which designates the United States and claims priority of pending Korean Patent Application Nos. 2003-0004182 filed Jan. 22, 2003, 2003-0004177 filed Jan. 22, 2003, 2003-0019092 filed Mar. 27, 2003 and 2003-0100422 filed Dec. 30, 2003.

FIELD OF THE INVENTION

The present invention relates to a grain refrigerator, and more particularly, to a grain refrigerator in which an evaporator is installed in a grain storage space as well as in a wall of a grain storage part to keep the entire space where grains are stored, at a constant temperature.

BACKGROUND ART

For the purpose of preserving grain for a long time by preventing spoilage of grain and occurrence of harmful insects, grain containers need to be maintained at a low temperature. Up to now, a variety of grain refrigerators have been researched and developed. Specifically, rice must be preserved at a low temperature in order for a long preservation and a protection from insects. By doing so, the flavor of rice also becomes good. For this reason, rice only refrigerators have been developed.

In conventional grain refrigerators, an evaporator is installed in a wall. Therefore, among a grain receiving space, an area adjacent to the wall is at the lowest temperature and a central area apart from the wall is at relatively high temperature. Like general refrigerators, since air convection phenomenon inside a storage space is limited due to grain, it is very difficult to maintain an overall storage space to uniform temperature. In case of large-sized grain refrigerators used in place of business, such as a restaurant, the difficulty becomes greater.

Additionally, in case of lowering the temperature for maintaining a central area of the grain refrigerator at a low temperature, dew condensation occurs at an area adjacent to the wall causing grain to be damaged.

Recently, because people want to drink water of appropriate temperature, water purifiers and water cooler/heaters become the necessary household electric appliances. Additionally, in order to reduce an installation space, a combination equipment integrally constructed with both the grain refrigerator and the water cooler/heater tends to be developed.

According to the grain refrigerators having a conventional water cooler/heater, however, a rice chest and a water cooler/heater are operated individually according to a refrigeration cycle having two kinds of refrigerant flows. Therefore, the number of parts increases and a manufacturing cost rises due to a complex installation structure. Further, the conventional grain refrigerators have a problem in that malfunctions may occur frequently.

DISCLOSURE OF THE INVENTION

The present invention has been made in an effort to solve the aforementioned problem, and accordingly an object of the present invention is to provide an evaporator installed in an inside of a grain storage space, particularly, in a center thereby keeping all grains stored in the grain storage space at a constant temperature.

DETAILED DESCRIPTION OF PREFERRED EMBODIMENTS

To achieve the above objects of the present invention, there is provided a grain refrigerator provided with a receiving container, a grain storage part installed in the receiving container, for storing a grain, and an evaporator forming a cooling cycle to keep the stored grain at a low temperature, wherein the evaporator is at least one or more and is installed in a grain storage space of the grain storage part to cool the stored grain.

One of the evaporators may be installed at a center of the grain storage part in a spiral shape in a length direction, or may have a plurality of bent portions on a plane of a multi-layer structure such that the respective layers of the plane are connected by an interconnection part such that a refrigerant of the one or more evaporators is circulated.

Preferably, the evaporator receiving part may be received by an evaporator receiving part formed of a material capable of retaining moisture therein. Alternatively, the evaporator may be coated with a coating layer.

The evaporator receiving part may comprise: a vertical rod installed at a center of the evaporator receiving part; a bottom part having a circular plate shape and installed at a bottom of the vertical rod; a cylindrical outer appearance part inserted onto an upper surface of an inner portion of an outer circumference of the bottom part; and a top part installed on an upper end of the vertical rod and covering an upper surface of the outer appearance part, wherein the evaporator is installed in a spiral shape in a length direction of the vertical rod.

The bottom part may further comprise a protruded jaw formed on an upper surface thereof in a circumferential direction inward from the outer circumference. Alternatively, a synthetic resin tube having a predetermined length and an elasticity is inserted onto the vertical rod and the evaporator is wound on an outer circumference of the synthetic resin tub. Also, a guide tube inserted onto the vertical rod may be installed between a bottom of the synthetic resin tube and the bottom part.

Alternatively, the above grain refrigerator may further comprise a buffer member, which makes the outer appearance part to be spaced apart from the evaporator and is for preventing a shaking of the evaporator. The evaporator receiving part may be formed of a far-infrared radiation material such as loess.

Preferably, a water purifier is installed adjacent to the grain refrigerator, the water purifier has a cool water tank evaporator for cooling water in a cool water storage tank, and an identical refrigerant is circulated through the evaporator for cooling the grain and the cool water tank evaporator. At this time, the refrigerant flows from the evaporator of the grain refrigerator to the cool water tank evaporator.

Alternatively, the above grain refrigerator may further comprise a temperature controller for keeping the grain refrigerator at a constant temperature, wherein the circulation of the refrigerant is controlled by the temperature controller.

Hereinafter, a preferred embodiment of the present invention will be described with reference to the accompanying drawings.

Figure 1:
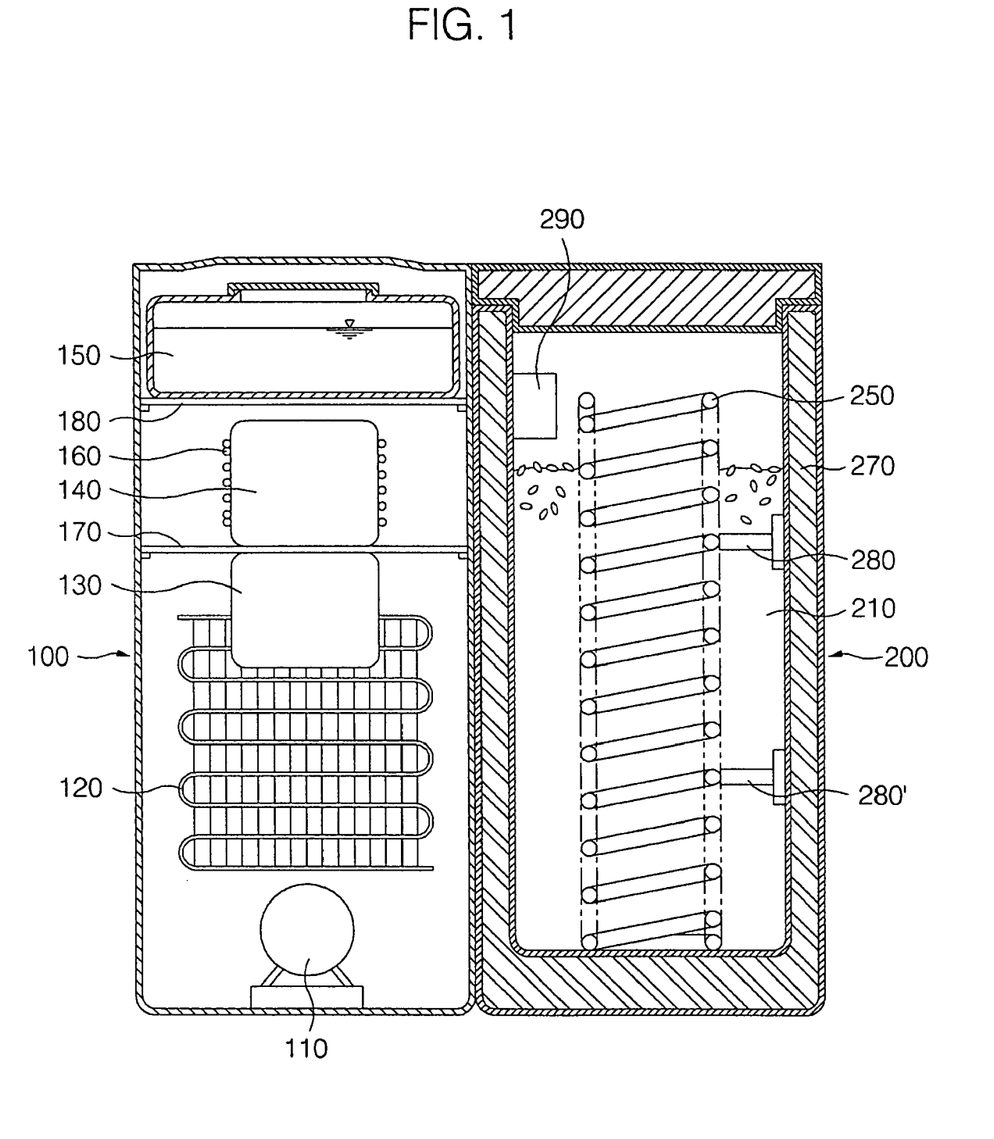
FIG. 1 is a sectional view of a grain refrigerator according to the present invention.
Figure 2:
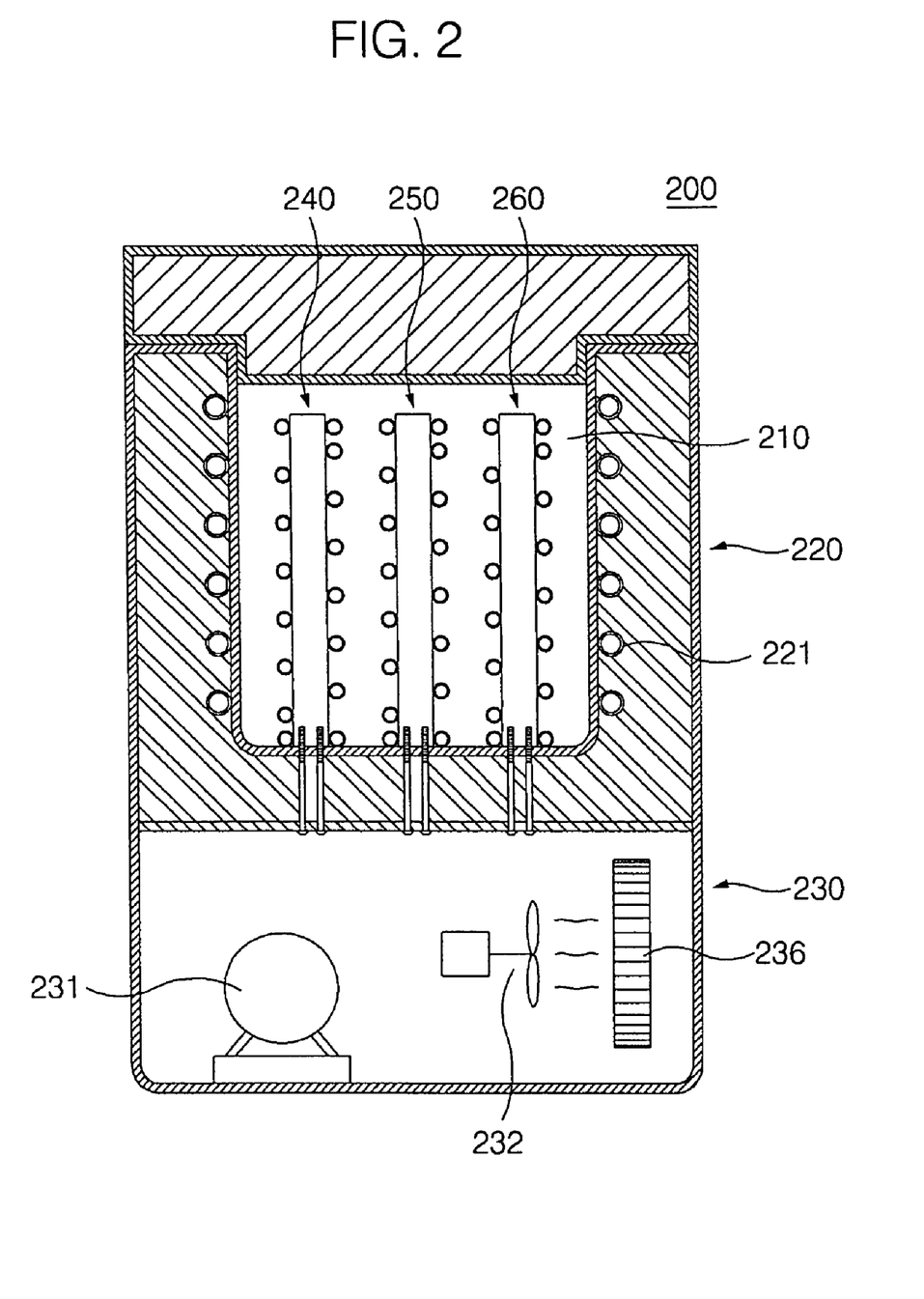
FIG. 2 is a sectional view of a receiving container and illustrates an installation of the evaporator.
Figure 3:
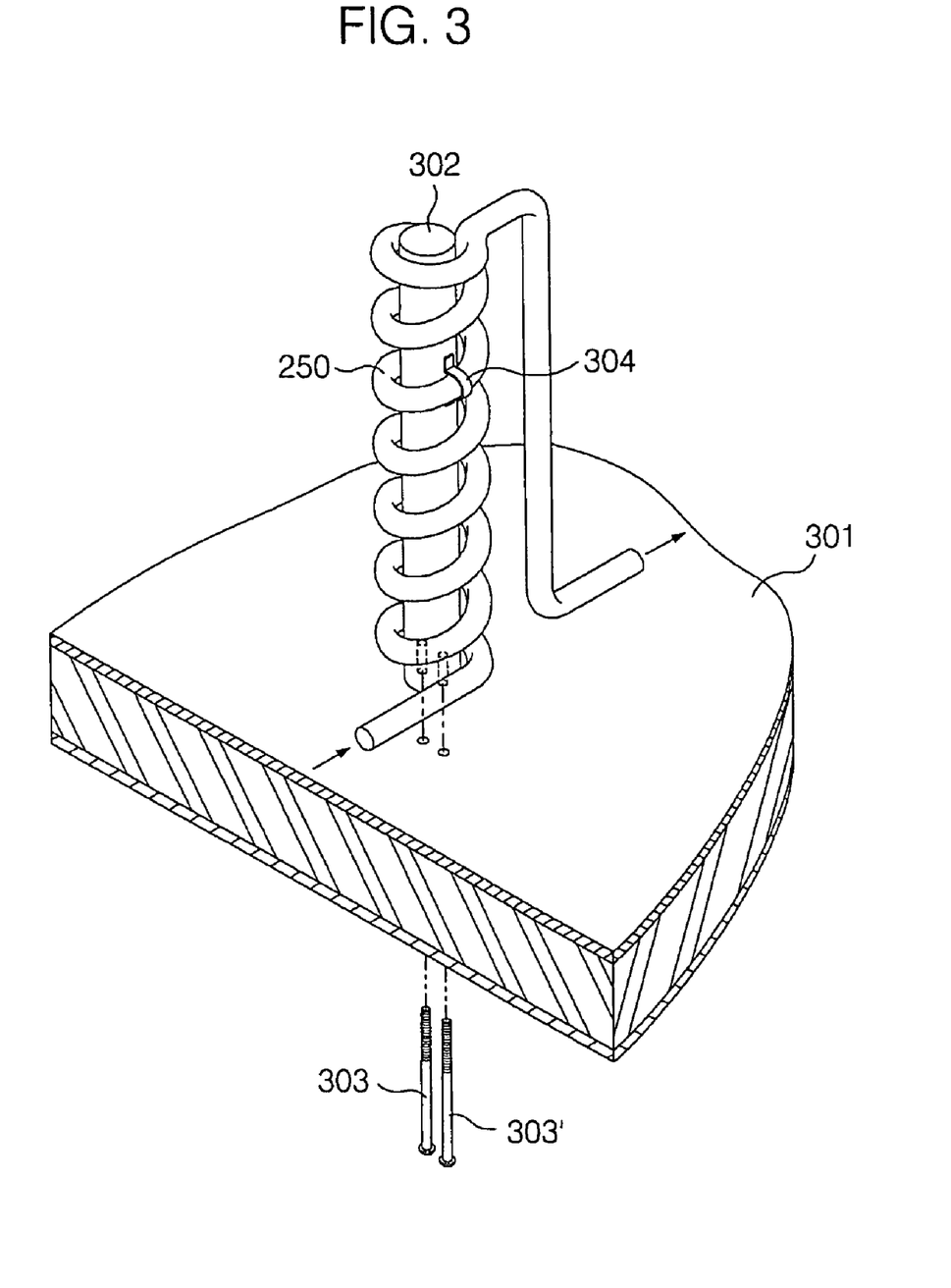
FIG. 3 is a perspective view of an evaporator according to another embodiment of the present invention.

FIG. 1 is a sectional view of a grain refrigerator according to the present invention and FIG. 2 is a perspective view of an evaporator and illustrates an installation of the evaporator.

Referring to FIGS. 1 and 2, a grain refrigerator 200 includes a grain storage part 210 installed inside a receiving container 220, a heat radiation part 230 formed at a lower portion of the receiving container 220, an auxiliary evaporator 221 installed inside a wall of the receiving container 220, and evaporators 240, 250 and 260 installed in the grain storage part 210 of the receiving container 220.

The heat radiation part 230 maintains the grains of the grain storage part 210 at a low temperature by the auxiliary evaporator 221, and is provided with a compressor 231 for compressing a refrigerant in a high temperature and a high pressure state, a blower 232 for inhaling air from an exterior and blowing the inhaled air, and a condenser 236 for changing the refrigerant compressed by the compressor 231 to a low temperature and a low pressure refrigerant using the air blown by the blower 232.

The auxiliary evaporator 221 according to a preferred embodiment of the present invention is directly connected with the evaporators 240, 250 and 260 to circulate the refrigerant.

The grain storage part 210 formed inside the receiving container 220 is provided with the first evaporator 250 installed at a center portion, and the second and third evaporators 240 and 260 installed between walls of the receiving container 220. The size and number of the first to third evaporates 240, 250, 260 are design consideration matters determined by the size of the grain refrigerator 200.

Also, the refrigerant moves from the auxiliary evaporator 221 to the evaporator 240, from the evaporator 240 to the evaporator 250, from the evaporator 250 to the evaporator 260, from the evaporator 260 to the auxiliary evaporator 221, and enters into the evaporator 250 and circulates in the order of the evaporator 240, the evaporator 260 and the auxiliary evaporator 221, and enters into the heat radiation part 230.

Preferably, the evaporators 240, 250 and 260 are made in various shapes. Also, the grain may be maintained at a low temperature by the evaporators 240, 250 and 260 without the auxiliary evaporator 221, and the number of the evaporators 240, 250 and 260 may be changed. FIG. 2 shows such an example.

A cylindrical fixing rod 302 is vertically coupled to a bottom 301 of the receiving container 220 by bolts 303, 303', the evaporator 250 is installed in a spiral shape along an outer circumference of the fixing rod 302, and the evaporator 250 is fixedly supported to the fixing rod 302 by a fixing clip 304 so as not to be shaken.

Thus, in the embodiment shown in FIG. 2, in case that only one evaporator is installed, the central evaporator 250 is preferably installed, thereby maintaining a uniform temperature throughout an entire space.

Figure 4:
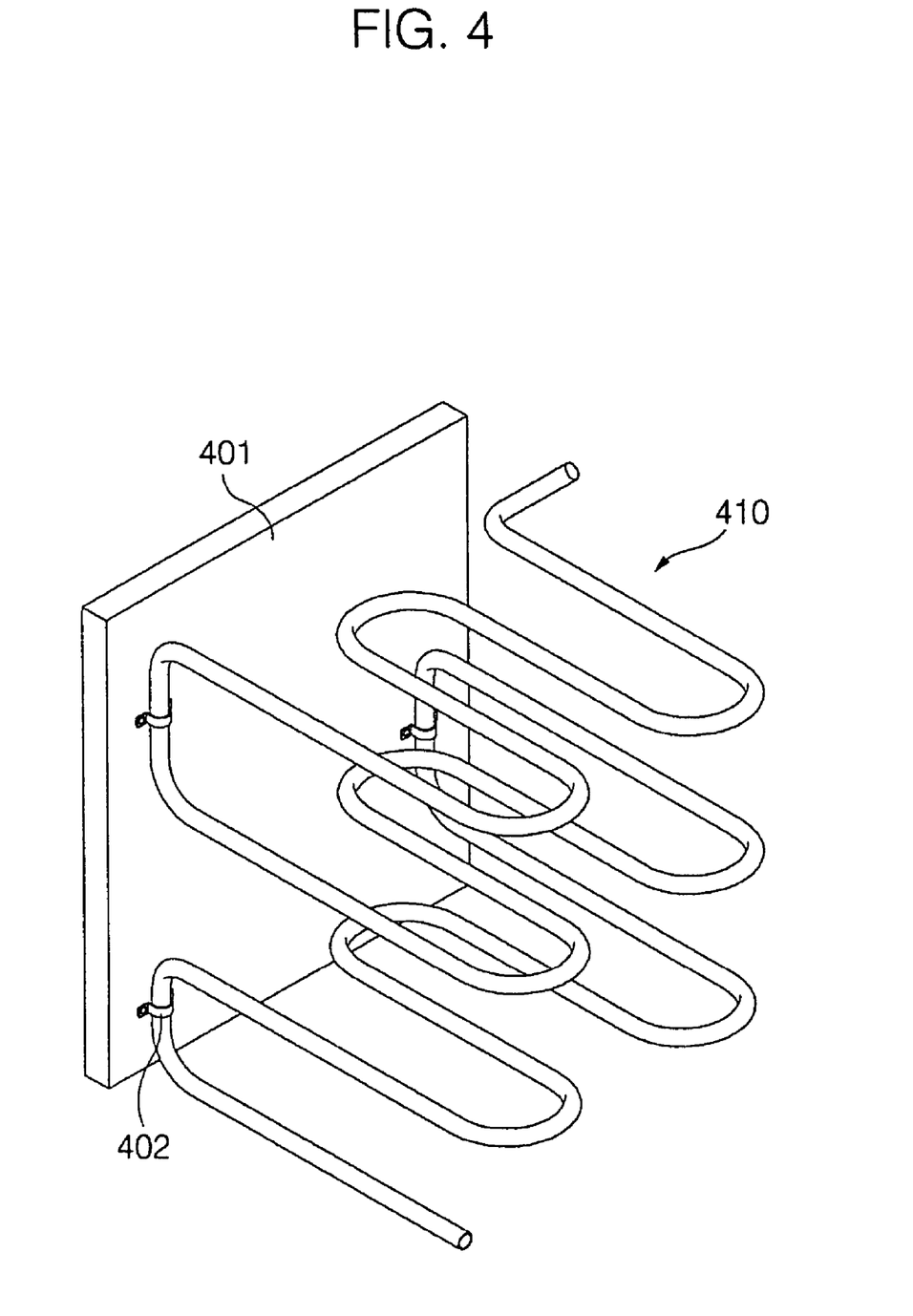
FIG. 4 is a cut perspective view of a grain refrigerator according to the present invention.

FIG. 4 is a perspective view of an evaporator according to another embodiment of the present invention.

In this embodiment, an evaporator 410 has a suitable structure when one evaporator is installed in the receiving container 220 to maintain a uniform temperature.

The evaporator 410 has a multi-layer structure. Each layer has a plurality of bent portions on a horizontal plane so as to be distributed in a wide area of the receiving container 220. End portions of the respective layers are continuous such that the refrigerant circulates. Also, the evaporator 410 is installed at a fixing body 401 fixed to the wall of the receiving container 220. The fixing body 401 is shaped in a plate, and connection pipes connecting the respective layers are fixed to the fixing body 401 by a fixing clip 402, thereby fixing the evaporator 401.

Figure 5:
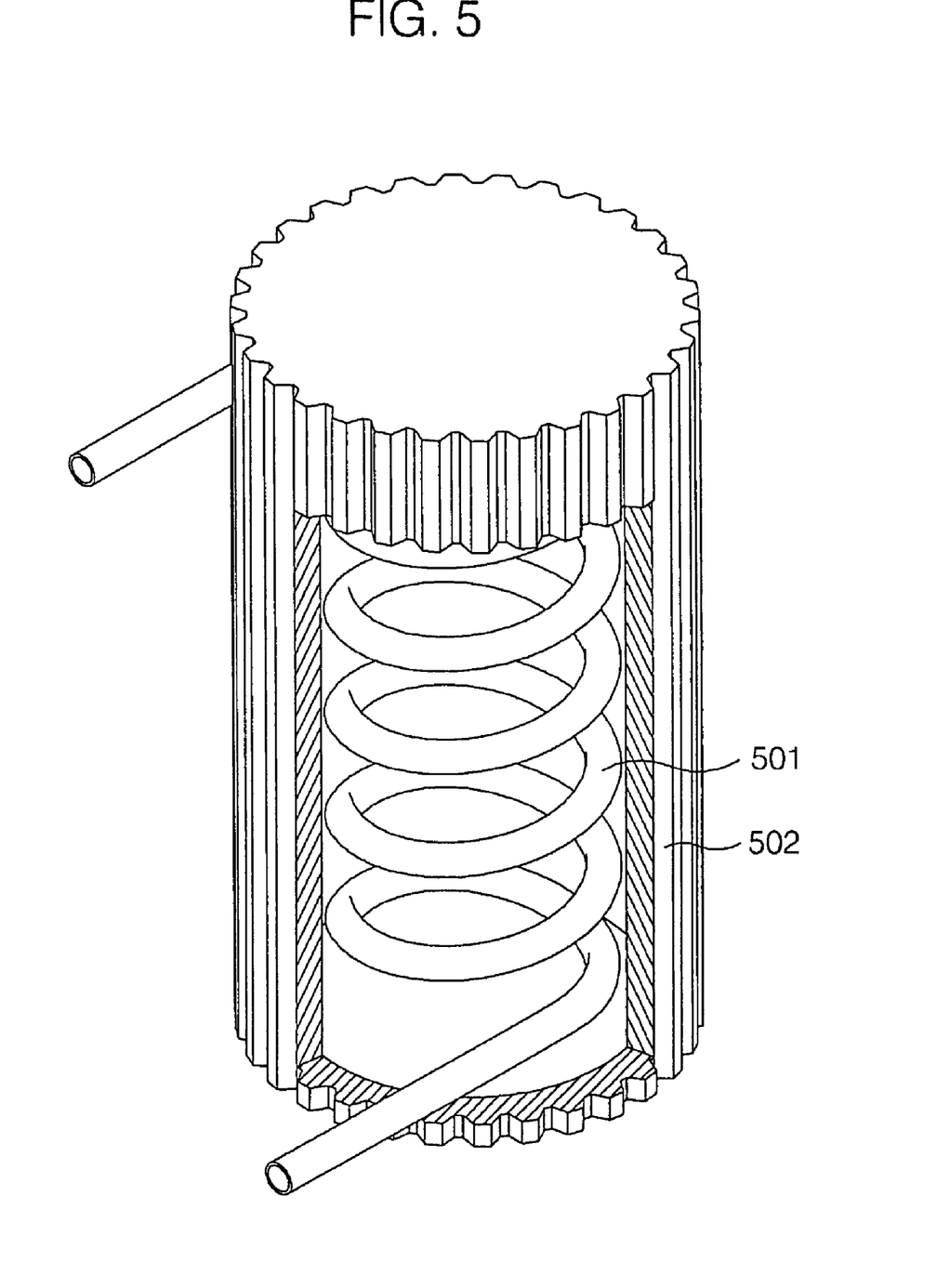
FIG. 5 is a partial cutaway perspective view of a grain refrigerator according to the present invention.

FIG. 5 is a cut perspective view of a grain refrigerator according to the present invention.

In the embodiment shown in FIG. 5, an evaporator 501 is directly in contact with grains, and is installed inside an evaporator receiving part 502 such that a small amount of moisture contained in the grains directly contacting the evaporator 501 is not condensed.

The evaporator receiving part 502 is preferably formed of loess, and is closed or partially opened by a cylindrical tube capable of receiving the evaporator 501 therein. Also, the evaporator receiving part 502 is preferably formed with a furrow along a circumference thereof so as to radiate cool air of the evaporator 501 easily. Also, the evaporator 501 is preferably formed in a spiral shape such that the evaporator 501 is received in the evaporator receiving part 502.

Figure 6:
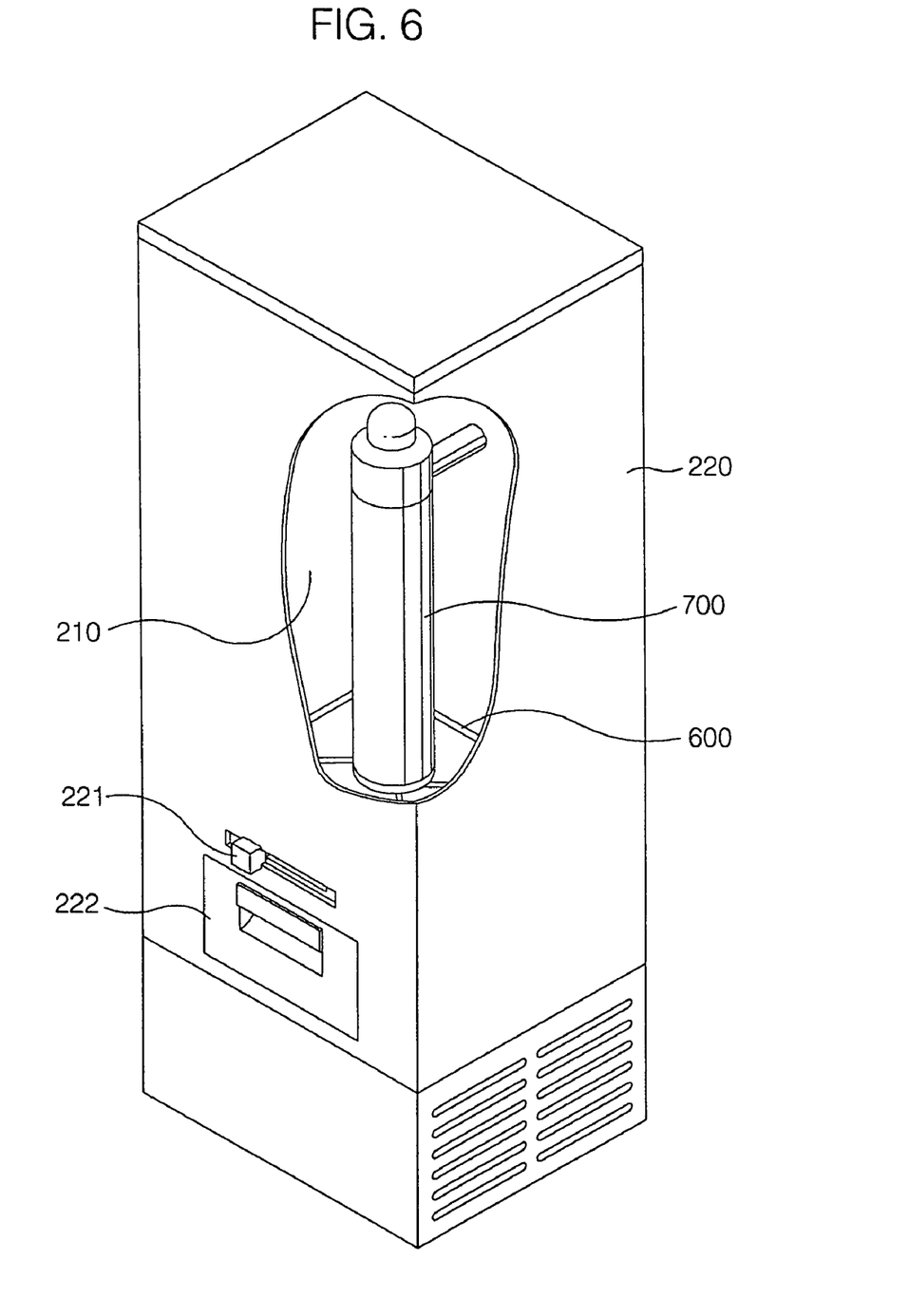
FIG. 6 is an assembly perspective view of FIG. 5.

FIG. 6 is a partial cutaway perspective view of a grain refrigerator according to the present invention. The receiving container 220 is provided therein with a diaphragm 600 having a through hole formed at a center portion thereof. An upper portion divided by the diaphragm 600 forms the grain storage part 210 and a lower portion forms an exhaust container 222 containing grains exhausted through the through hole of the diaphragm 600. The through hole of the diaphragm 600 is connected to a sealing part (not shown) opening or closing the through hole by an exhaust handle 221.

As shown in FIG. 6, when the exhaust handle 221 is pushed right, the through hole is opened so that the grains stored in the grain storage part 210 drop to the exhaust container 222 installed below the through hole through the through hole. Also, at an upper center portion of the diaphragm 600, an evaporator and an evaporator receiving part 700 are installed. Below the exhaust container 222, a compressor 231 and a condenser 233 forming a cooling cycle along with the evaporator are installed.

Figure 7:
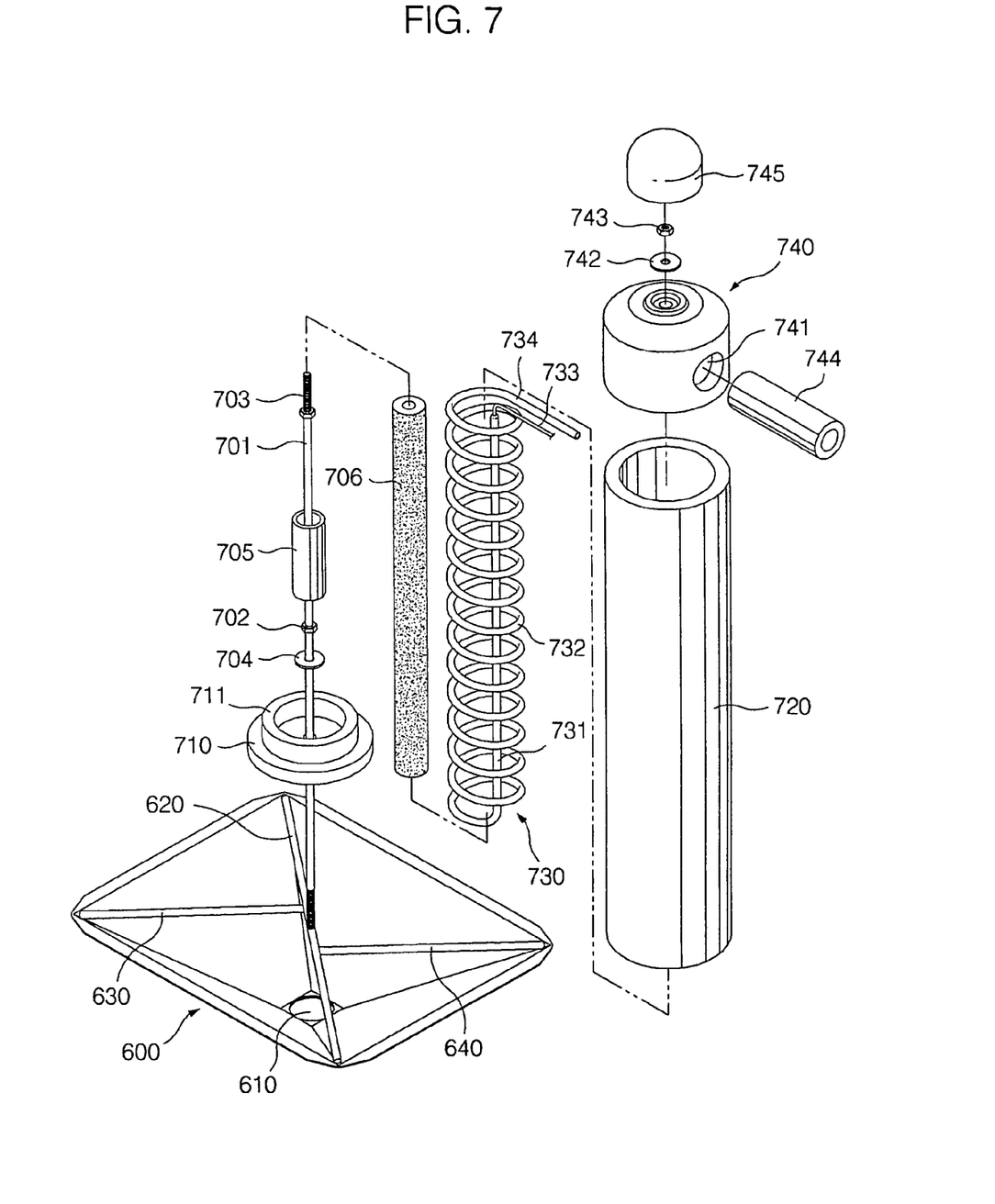
FIG. 7 is a sectional view taken along a length direction of FIG. 5.
Figure 8:
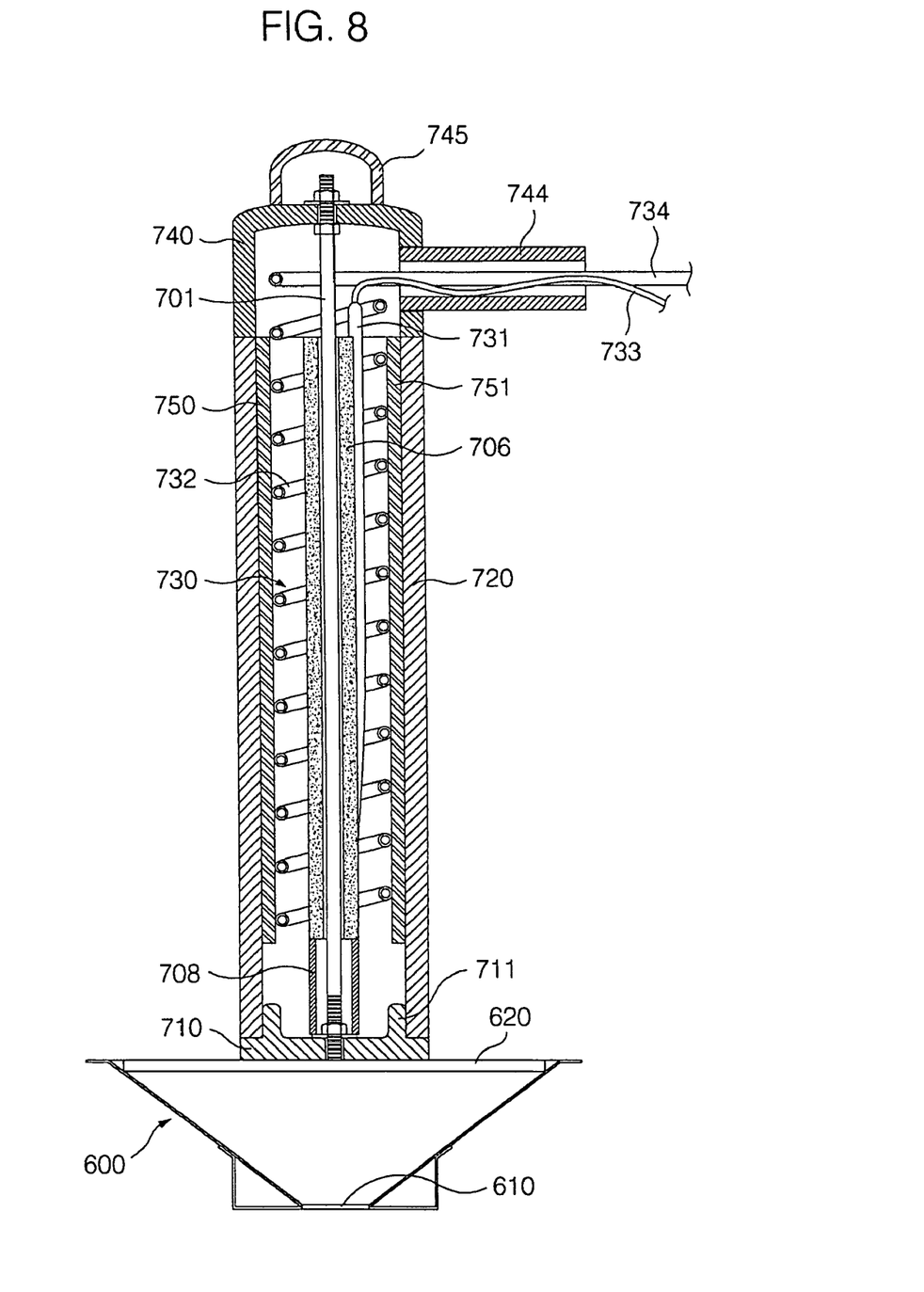
FIG. 8 is a sectional view of a grain refrigerator according to the present invention.

FIG. 7 is an assembly perspective view of FIG. 6, and FIG. 8 is a sectional view taken along a length direction of FIG. 6.

The diaphragm 600 has a structure inclined toward the through hole 610 positioned at a center thereof such that the grains stored in the grain storage part 210 are exhausted to the lower portion through the through hole 610. The diaphragm 600 has horizontal supporting bars 620, 630, 640 welded at four corners. The support bar 620 is installed between two diagonal corners, one end of the supporting bar 630 is coupled to a corner and the other end is coupled perpendicular to the supporting bar 620. Also, one end of the supporting bar 640 is coupled to the remaining corner, and the other end is coupled to the supporting bar 620. A vertical rod 701 is welded to a center of the supporting bar connecting the two corners in a vertical direction.

The vertical rod 701 has lower end and upper end each having a screw thread of a predetermined length. A bottom part 710 of the receiving part is inserted onto the vertical rod 701 through a penetration hole formed at a center thereof at a mid portion of the vertical rod 701. The bottom part 710 has a protrusion jaw 711 formed in a circumferential direction between the central penetration hole and an outer circumference. If the bottom part 710 of the receiving part is inserted onto the vertical rod 701, a washer 704 and a nut 702 are inserted onto the vertical rod 701 and then the bottom 710 is coupled to the vertical rod 701. A lower portion of the bottom part 710 is mounted on a connection part of the supporting bars 620 and 630 and a connection part of the supporting bars 620 and 640 so that the bottom part is firmly fixed.

Also, a guide tube 705 is inserted onto the vertical rod 701 and is then installed inside the protrusion jaw 711 of the bottom part 710. A sponge tube 706 having an elasticity is inserted and installed on the guide tube 705. The guide tube 705 fixes and supports the sponge tube 706 when a spiral part 732 of the evaporator is inserted along an outer circumference of the sponge tube 706. An outer tube 720 of the receiving part is inserted and installed onto an outer surface of the protrusion jaw 711 of the bottom part 710 of the receiving part. At this time, the bottom part 710, the guide tube 705, the outer tube 720, an upper tube 740 and an induction tube 744 to be described later, are preferably formed of a solid material that deformation is not caused, or a material radiating far-infrared radiation. Particularly, loess is more preferable because it can retain a certain amount of moisture therein, which moisture may be produced in the cooling operation.

An evaporator 707 is installed between the sponge tube 706 and the outer tube 702. The evaporator 707 includes a straight line part 731 shaped in a straight line from an upper end to a lower end, and a spiral part 732 directed toward the upper end from the lower end of the straight line part 731. The upper end of the straight line part 731 is connected with a capillary tube 733 such that a refrigerant is introduced into the straight line part 731 through the capillary tube 733. An upper tube 740 facing the top surface of the outer tube 720 is installed on the top surface of the outer tube 720. The upper tube 740 of the receiving part has an opened lower portion and a cylindrical side portion. The lower portion of the cylindrical tube faces the top surface of the outer tube 720 and has a predetermined sized through hole. The upper surface of the cylindrical tube is formed in a curved shape, and has a through hole into which the vertical rod 701 penetrates. The vertical rod 701 is inserted into the through hole of the upper tube 740, and the exhaust tube 734 and the capillary tube 733 connected to the upper end of the spiral part 732 are led out through a penetration hole 741 formed at a side portion of the upper tube 740. After the exhaust tube 734 and the capillary tube 733 are led out, the washer 742 and the nut 743 are inserted onto the vertical rod and fixed. The exhaust tube 734 is connected with a connection pipe and then led out of the housing through an induction tube 744. The upper end of the vertical rod 701 is protruded from the upper surface of the upper tube 740 of the receiving part through the through hole of the upper tube 740 such that the nut 743 is exposed to an exterior. The exposed upper surface of the upper tube 740 is coved by a cap 745 such that the exposed nut 743 or the like is concealed. At this time, the cap 745 is adhered to the upper tube 740 by an adhesive.

Meanwhile, in case where the outer tube 720 of the receiving part is directly in contact with the spiral part 732 of the evaporator, dew condensation phenomenon is generated inside and outside the outer tube 720. Hence, to prevent a contact between the outer tube 720 and the spiral part 732 and to prevent a shaking of the evaporator, a buffer material 750, 751 such as sponge or styrofoam between the spiral part 732 and the outer tube.

The evaporator constructed as above is simple in assembly and is strong. Although the evaporator receiving part proposed herein is vertically installed, it may be installed horizontally. Hence, it would be well understood to those skilled in the art that alteration on design can be made.

FIG. 1 is a sectional view of a grain refrigerator according to the present invention.

As shown in FIG. 1, the grain refrigerator is constructed in contact with a water cooler/heater 100 in parallel with each other.

An inside of the water cooler/heater 100 is divided into three rooms by two diaphragms 170 and 180. The uppermost room has a water storage part 150 for storing water. In the mid room, a cool water tank 140 is installed on the diaphragm 170, and water of the water storage part 150 is introduced into the cool water tank 140. An evaporator 160 is installed on an outer wall of the cool water tank 140.

The lowermost room is provided with heat radiation devices. Hence, the diaphragm 170 is preferably formed of an adiabatic wall. A hot water tank 130 is installed below the diaphragm 170 such that hot water is supplied by a heater. The hot water tank 130 is also supplied with water from the water storage tank 150. A compressor 110 is installed at a lower portion of the lowermost room, and a condenser 120 is installed on a sidewall of the lowermost room. In addition to the above-mentioned parts, various parts such as a capillary tube forming a cooling cycle exist, but their description will be omitted since it is general.

In this embodiment, the grain refrigerator 200 is installed in contact with a sidewall of the water cooler/heater 100. The grain refrigerator 200 is constructed in a general rice box having an exhaust hole (not shown), and has a grain storage part 210 capable of storing grains in an internal space surrounded by a wall 270. A spiral evaporator 250 is fixed to the wall by a fixing member 280, 280' in a space of the grain storage part 210 to operate or stop the compressor 110. The temperature controller 290 is directly attached on the evaporator 250 to maintain the evaporator 250 at a constant temperature.

Next, an operation of the grain refrigerator 200 installed in contact with the water cooler/heater will be described.

A high temperature and high pressure refrigerant compressed in the compressor 110 is liquefied through the condenser 120. The pressure of the refrigerant is reduced through the capillary tube. The pressure-reduced refrigerant is introduced into a lower portion of the evaporator 250 installed in the grain storage part 210, circulates and is then exhausted through an upper end of the evaporator 250. After that, the refrigerant circulates in the evaporator 160 installed in the cool water tank 140 of the water cooler/heater 100, and returns to the compressor 110 and is then compressed. At this time, since the temperature controller 290 controls the temperature of the compressor 110 by the temperature of the grain storage part 210 or the temperature of the evaporator 250, it is possible to maintain the grain storage part at a constant temperature.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

INDUSTRIAL APPLICABILITY

As described above, in an inventive grain refrigerator and an inventive grain refrigerator provided with a water purifier, since the evaporator is directly installed in the grain storage part, a high temperature phenomenon at a center portion of the storage space can be prevented. Also, since all the stored grains are exposed to a uniform cooling environment, the grains can be stored for a long-term period.

In particular, in the grain refrigerator provided with the water purifier, since the refrigerant circulating the evaporator of the grain refrigerator also circulates the evaporator of the water purifier and the temperature control is performed in accordance with the temperature of the grain refrigerator, the grains stored in the grain refrigerator and the water stored in the cool water tank can be always kept at a constant temperature.

What is claimed is:

1. A grain refrigerator provided with a receiving container, a grain storage part installed in the receiving container, for storing a grain, and an evaporator for cooling the stored grain at a low temperature,
   wherein the evaporator is received in an evaporator receiving part, the evaporator is at least one or more, and is installed in a grain storage space of the grain storage part to cool the stored grain,
   wherein one of the evaporators is installed in the middle of the grain storage part in a spiral shape in a lengthwise direction.

2. A grain refrigerator provided with a receiving container, a grain storage part installed in the receiving container, for storing a grain, and an evaporator for cooling the stored grain at a low temperature,
   wherein the evaporator is received in an evaporator receiving part, the evaporator is at least one or more, and is installed in a grain storage space of the grain storage part to cool the stored grain,
   wherein the evaporator has a plurality of bent portions on a plane of a multi-layer structure, and the respective layers of the plane are connected by an interconnection part such that a refrigerant of the one or more evaporators is circulated.

3. The grain refrigerator of claim 2, wherein the evaporator is coated with a coating layer.

4. The grain refrigerator of claim 2, wherein the evaporator receiving part comprises:
   a vertical rod installed in the middle of the evaporator receiving part;
   a bottom part having a circular plate shape and installed at a bottom of the vertical rod;
   a cylindrical outer appearance part inserted onto an upper surface of an inner portion of an outer circumference of the bottom part; and
   a top part installed on an upper end of the vertical rod and covering an upper surface of the outer appearance part,
   wherein the evaporator is installed in a spiral shape in a length direction of the vertical rod.

5. The grain refrigerator of claim 4, wherein the bottom part further comprises a protruded jaw formed on an upper surface thereof in a circumferential direction inward from the outer circumference.

6. The grain refrigerator of claim 4, wherein a synthetic resin tube having a predetermined length and an elasticity is inserted onto the vertical rod and the evaporator is wound on an outer circumference of the synthetic resin tub.

7. The grain refrigerator of claim 6, wherein a guide tube inserted onto the vertical rod is installed between a bottom of the synthetic resin tube and the bottom part.

8. The grain refrigerator of claim 4, further comprising a buffer member, which makes the outer appearance part to be spaced apart from the evaporator and is for preventing a shaking of the evaporator.

9. The grain refrigerator of claim 4, wherein the evaporator receiving part is formed of a far-infrared radiation material.

10. The grain refrigerator of claim 9, wherein the far-infrared radiation material is loess.

11. The grain refrigerator of claim 2, wherein a water purifier is installed adjacent to the grain refrigerator, the water purifier has a cool water tank evaporator for cooling water in a cool water storage tank, and an identical refrigerant is circulated through the evaporator for cooling the grain and the cool water tank evaporator.

12. The grain refrigerator of claim 11, wherein the refrigerant flows from the evaporator of the grain refrigerator to the cool water tank evaporator.

13. The grain refrigerator of claim 11, further comprising a temperature controller for keeping the grain refrigerator at a constant temperature, wherein the circulation of the refrigerant is controlled by the temperature controller.

* * * * *